(12) United States Patent
Ardigo (10) Patent No.: US 8,505,794 B2
(45) Date of Patent: Aug. 13, 2013

(54) FLEXIBLE STORAGE SYSTEM

(75) Inventor: Frank Ardigo, Saint Clair, MI (US)

(73) Assignee: Faurecia Interior Systems, Inc., Auburn Mills, MI (US)

( * ) Notice: Subject to any disclaimer, the term of this patent is extended or adjusted under 35 U.S.C. 154(b) by 425 days.

(21) Appl. No.: 12/955,387

(22) Filed: Nov. 29, 2010

(65) Prior Publication Data

US 2012/0132684 A1 May 31, 2012

(51) Int. Cl.
*B60R 7/04* (2006.01)

(52) U.S. Cl.
USPC .................. 224/543; 224/557; 296/146.7

(58) Field of Classification Search
USPC ...... 224/545, 555, 556, 557, 543; 296/146.7, 296/1.08, 39.1
See application file for complete search history.

(56) References Cited

U.S. PATENT DOCUMENTS

| | | | |
|---|---|---|---|
| 3,606,721 A | 9/1971 | Meyer | |
| 4,422,276 A | 12/1983 | Paravano | |
| 4,720,028 A * | 1/1988 | Takemura et al. | 224/553 |
| 5,415,457 A * | 5/1995 | Kifer | 297/188.04 |
| 5,588,631 A * | 12/1996 | Yee | 248/553 |
| 5,685,470 A * | 11/1997 | Moore | 224/567 |
| 5,855,310 A * | 1/1999 | Van Ert et al. | 224/543 |
| 6,138,883 A * | 10/2000 | Jackson et al. | 224/404 |
| 6,481,604 B1 * | 11/2002 | Beene et al. | 224/404 |
| 6,550,654 B1 * | 4/2003 | Crago | 224/275 |
| 7,086,816 B2 * | 8/2006 | Nolle | 410/118 |
| 7,234,619 B2 | 6/2007 | Hicks | |
| 7,614,836 B2 * | 11/2009 | Mohiuddin et al. | 411/510 |
| 7,731,026 B2 * | 6/2010 | Harrison | 206/349 |
| 7,980,614 B2 * | 7/2011 | Denton et al. | 296/24.3 |
| 2005/0279898 A1 * | 12/2005 | Sweere et al. | 248/221.12 |
| 2008/0136144 A1 * | 6/2008 | Spahr et al. | 280/728.3 |

FOREIGN PATENT DOCUMENTS

GB 445918 3/1935

* cited by examiner

*Primary Examiner* — Justin Larson
(74) *Attorney, Agent, or Firm* — Matthew B. Dernier, Esq.; Gibson & Dernier LLP (57) ABSTRACT

A flexible storage system included in a vehicle interior comprises receiving elements configured on a surface facing the vehicle interior and different attachments that are made to be attached to the receiving elements. The receiving elements comprise a primary aperture connected to a slot that extends downwards towards a floor of the vehicle. Each of the attachments comprises at least one connecting element which has a shape that is complementary to the primary apertures of respective receiving elements and a shaft that connects the connecting element to the attachment. The attachments are detachably connected to the receiving elements when in use and stowed away when not in use. Thus, the storage system provides flexibility in that not only is it employed only when necessary, but it also provides a variety of storage attachments that are suited to different user needs.

14 Claims, 6 Drawing Sheets

FIG. 6 understanding# FLEXIBLE STORAGE SYSTEM

FIELD OF THE INVENTION

The present invention relates generally to the interior of vehicles and more particularly, to providing flexible (user adjustable) storage areas within such interiors.

BACKGROUND OF THE INVENTION

Automobile interiors typically have interior trim panels that are supplied with storage areas that are used for many purposes such as storing utensils, tools or other articles. For example, interior door trim panels are normally supplied with map pockets. In fact, in many of the larger vehicles such as trucks or SUVs, the map pockets can be adapted to store articles other than maps, for example, utensils like cups, etc. However, such map pockets can be difficult to reach if items fall to the bottom of the pocket. Additionally, the items placed in the map pockets can fall out of the pocket during passengers' ingress and egress from the vehicle.

The map pockets are generally fixed in their shape and size as they are often configured using hard plastic material of the surface on the vehicle door. In some instances, the space provided by the map pocket may not be adequate or the pocket may not be appropriately shaped for certain applications. For example, the map pocket may be relatively big, which makes it difficult to locate smaller items stored therein. In addition, fixed structures, such as the map pockets or additional storage boxes, occupy part of the limited interior passenger space even when not in use. Therefore, a flexible, adjustable storage system that facilitates storage of various articles of different sizes and shapes within a vehicle interior which has limited space is desirable.

SUMMARY OF THE INVENTION

In accordance with various aspects described herein, a flexible storage system that accommodates articles of different sizes and shapes is disclosed.

In one aspect, the storage system includes receiving elements configured within a plane of a surface facing a vehicle interior and one or more attachments to be connected to the receiving elements. The receiving elements are configured as apertures on the surface so that they do not project out of the surface and occupy interior space when there are no attachments connected within them. Each of the apertures of the receiving elements further comprises a primary aperture connected to an elongated slot that extends downwards away from the primary aperture and towards a floor of the vehicle. The primary aperture and the elongated slot may each have different shapes. For example, the primary aperture can be configured in different regular or irregular shapes such as a circle, polygon, star etc., while the slot can be configured in the shape of a rectangle, a square, an oval etc. Thus, the receiving elements will be different combinations of the variously shaped primary apertures and the slots.

In accordance with further aspects, the receiving elements can be formed on hard plastic surfaces of the vehicle interior such as the map pockets or on trim panels. When configured within a trim panel, the receiving elements extend from a skin of the trim panel and through the substrate of the trim panel. In order to hold the various layers of the time panel in place, the receiving elements can be finished with grommets or inserts that are shaped to fit into the apertures of the receiving elements. Alternatively, the skin of the trim panel can be extended to cover the receiving element along its edge, although the grommet may be preferred for the additional strength it can provide.

In yet another aspect, each of the attachments comprises a shaft that connects a connecting element to the attachment. The connecting element and the shaft are configured to have shapes that are complementary to the primary aperture and slot respectively of the receiving elements to which the attachments are meant to be connected. Thus, the attachments are received within the receiving elements and held therein due to their weight and their shape which is complementary to that of the receiving elements.

Various kinds of attachments such as secondary storage boxes, cases for carrying CDs (compact discs), spectacles, coffee cup receptacles etc. are contemplated as attachments that can be used with the flexible storage system. In fact, some of the attachments can include intermediate structures, such as hooks, that facilitate attachment of other devices. The storage system in accordance with the different aspects as described herein thus provides flexibility not only in terms of its deployment within the vehicle interior based on necessity but also in terms of the different types of storage that are afforded due to the design of attachments that can be connected to the receiving elements.

A method of providing flexible storage areas within vehicle interiors is disclosed in accordance with a further aspect described herein. This method comprises identifying areas within a vehicle interior that are suitable for providing the flexible storage system described herein. For example, surfaces of doors facing the vehicle interior or the back panel of seats etc. can be identified for placement of the receiving elements. Upon such identification, one or more receiving elements that are appropriately shaped and sized for such areas can be included on the surfaces. As described supra, the receiving elements can be included on either hard surfaces or softer trim panels. Different attachments for connecting to the receiving elements can be supplied to facilitate flexible storage based on user requirements.

DETAILED DESCRIPTION OF THE DRAWINGS

In the following description, for purposes of explanation, specific numbers, materials and configurations are set forth to provide a thorough understanding of the invention. It will be apparent to one having ordinary skill in the art that the invention may be practiced without these specific details. In some instances, well-known features may be omitted or simplified so as not to obscure the present invention.

Figure 1:
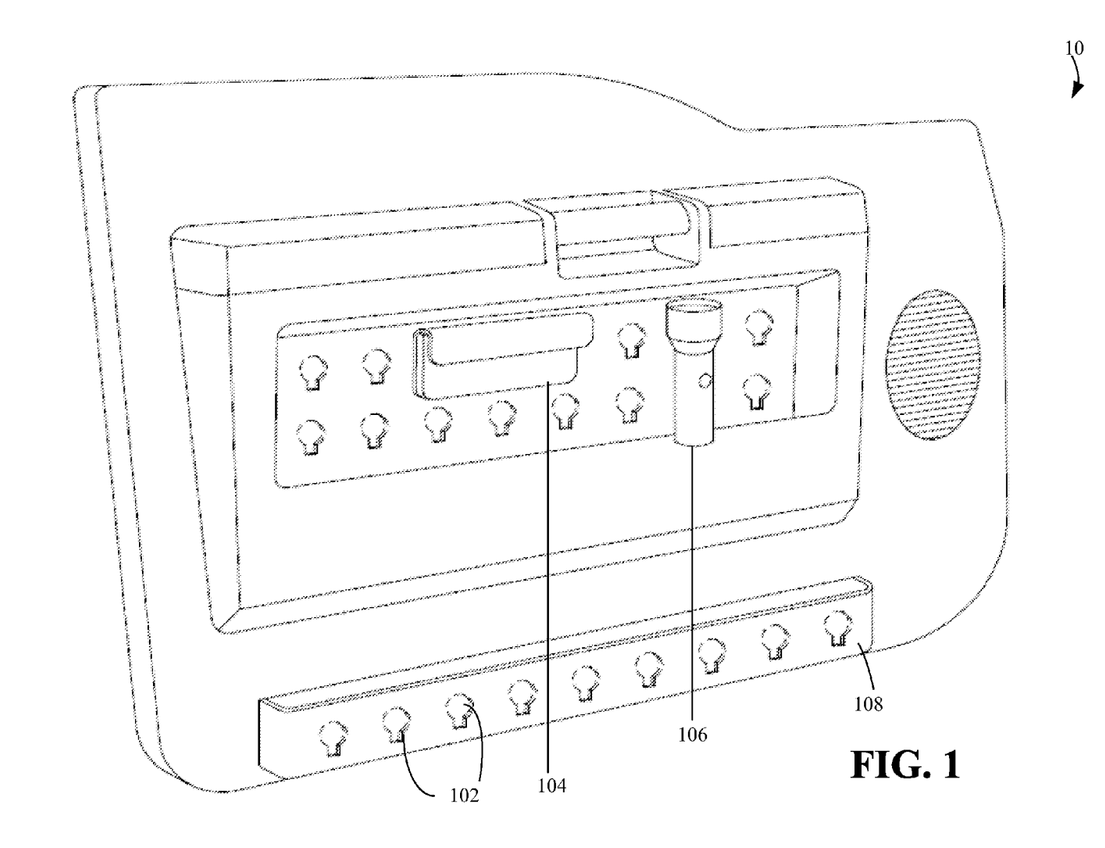
FIG. 1 illustrates a flexible storage system in accordance with one or more embodiments of the present invention.

Turning now to the drawings, FIG. 1 shows a flexible storage system 10 in accordance with one or more embodiments of the present invention. The storage system 10 comprises a plurality of receiving elements 102 included on the walls facing a vehicle interior. Various driving tools or utensils can have one or more connectors complementary to the receiving elements 102 which facilitate connecting such tools/utensils to the receiving elements 102. In particular, FIG. 1 shows a storage pocket 104 and a flashlight 106 suspended from the receiving elements 102 via their respective connecting element(s) which will be described in further detail infra. The connecting elements may be arranged such that the tools are attached to the receiving elements in horizontal or vertical orientations. Thus, the utility of the map pocket storage area is expanded to include extra pockets 104 which facilitate storage and easier retrieval of smaller objects in addition to storing irregularly shaped tools such as the flashlight 106.

It may be appreciated that the additional storage pocket 104 and tools such as the flashlight 106 are shown only for illustrative purposes and that other tools also may be included in the storage system including storage attachments which may be bigger than the map pocket 108 based on the availability of space within the vehicle interior. It may also be appreciated that the receiving elements 102 are shown on the interior of the vehicle door as a means of illustration and not limitation. In fact, the receiving elements 102 may be included at any appropriate part of the vehicle interior wherever a flexible storage system is desired and appropriate. Thus, various locations within a vehicle interior may be identified and the receiving elements 102 may be included on the surfaces thereon to facilitate providing a flexible storage system at the identified locations. Furthermore, the number of receiving elements 102 on a vehicle interior surface may be varied based on predetermined customer needs and/or available area.

Figure 2:
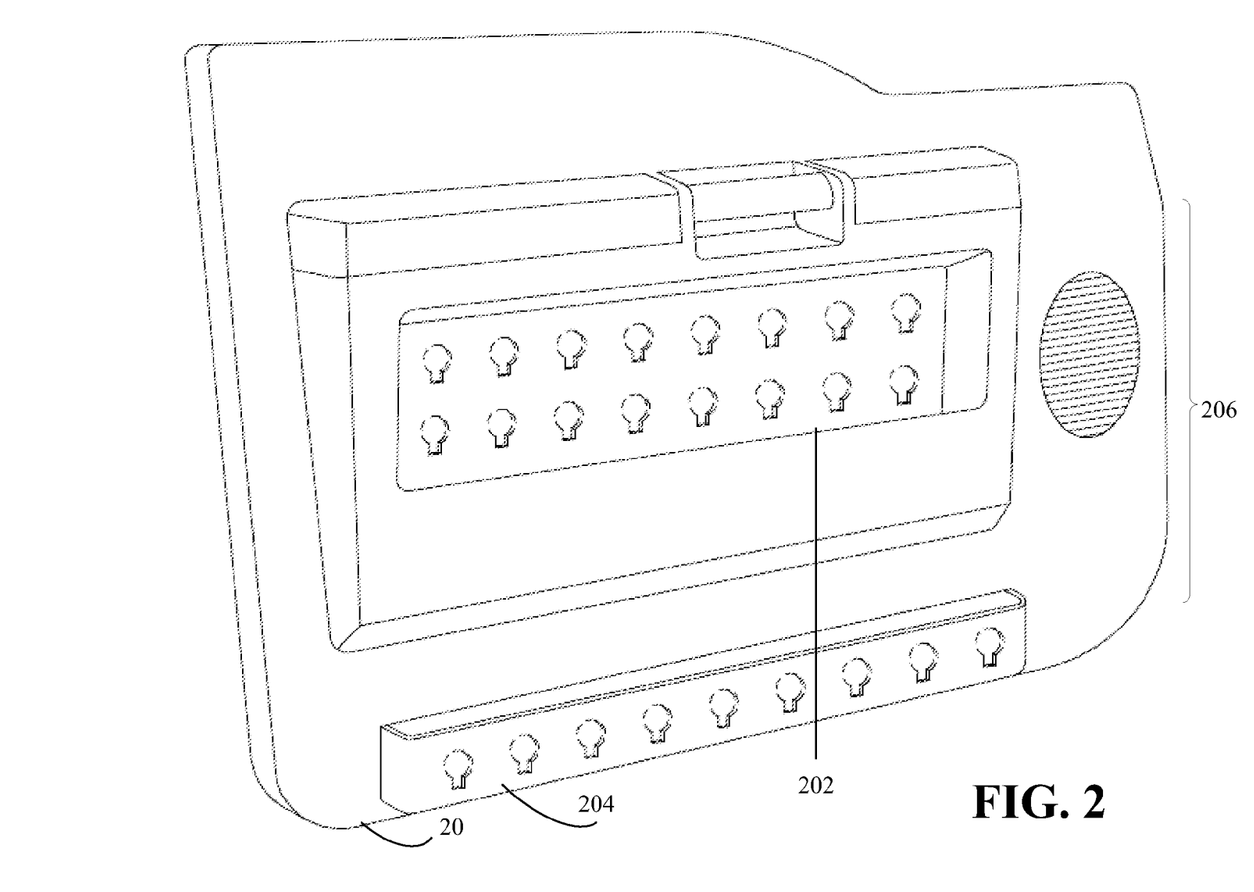
FIG. 2 illustrates an aspect of the flexible storage system used in a vehicle interior.

FIG. 2 shows an aspect of the storage system used on a vehicle door 20. In particular, the receiving elements 102 are included on the inner surface 202 and outer walls 204 of a map pocket storage area 206 located on an interior surface of the vehicle door 20. As described supra, the receiving elements 102 can accommodate popular driving tools which can be sold separately as accessories to the vehicle and would have the mating, connecting elements for connecting thereto. It may be appreciated that although the receiving elements 102 are illustrated as key holes, this is not necessary and that the receiving elements 102 can be configured in any desirable shape so long as the accessories have corresponding connectors for fixing them therein. The details of such receiving elements 102 will be further discussed infra.

The aspect of providing receiving elements 102 in a vehicle without the actual attachments lends flexibility to the storage system as compared to conventional storage systems used inside the vehicles. Various kinds of attachments can be used with the receiving elements 102 based on a customer's requirements. Moreover, the attachments can be connected to the receiving elements 102 only when desired. When the attachments are not in use, they may be removed thereby expanding the area available to the passengers within the vehicle interior. This is because, the receiving elements 102 are configured within a plane of the surface bearing them thereon, e.g., a wall of the door 20 and do not generally project out of the plane of the interior surface. Hence, the receiving elements 102 do not occupy any extra interior space when the attachments, such as the storage pocket 104, are not connected. This is advantageous as compared to conventional storage systems, wherein the storage areas are fixed, thereby taking up precious interior space within a vehicle even when they are not in use.

Figure 3A:
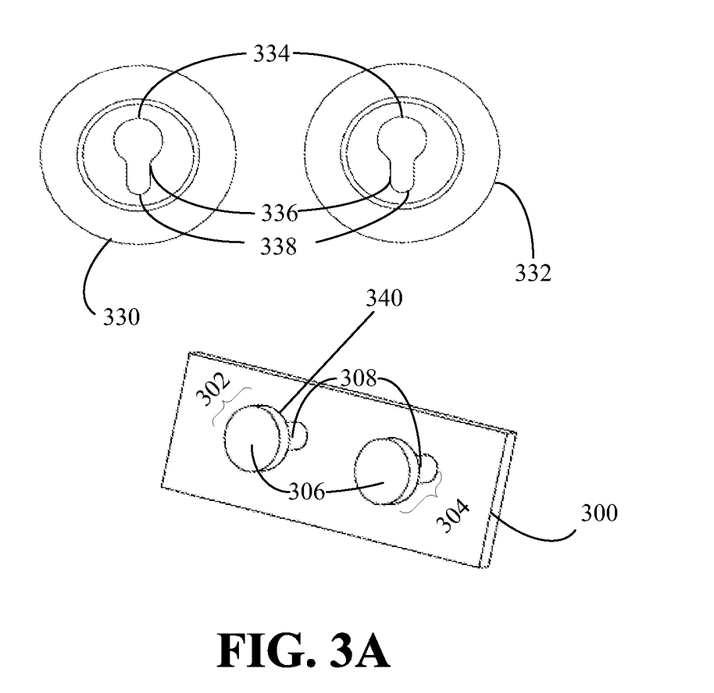
FIG. 3A shows a more detailed aspect of the attachments and the corresponding receiving elements.
Figure 3B:
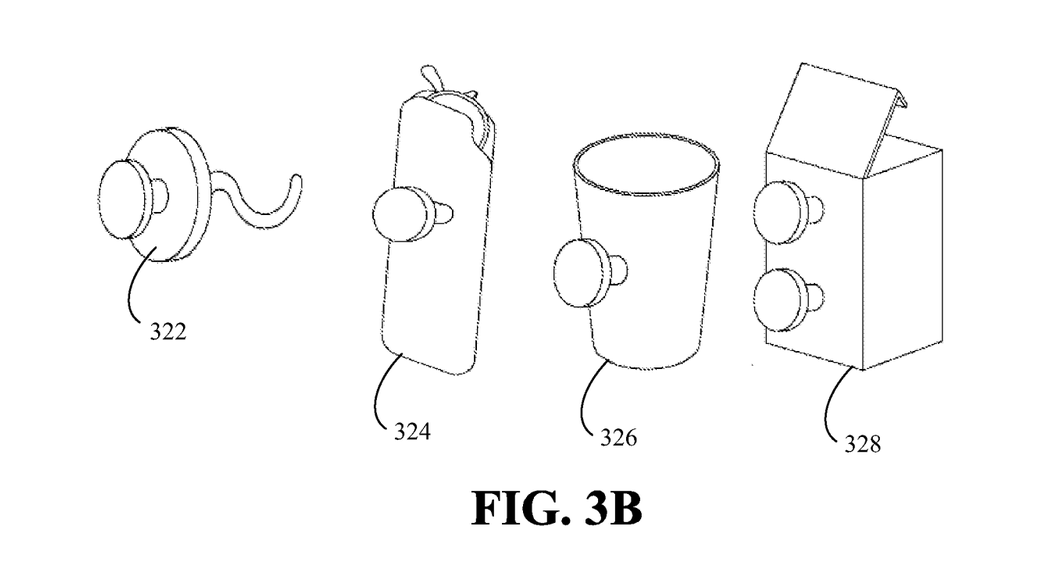
FIG. 3B shows the various attachments suitable for connecting to one or more of the receiving elements.

FIGS. 3A and 3B show another aspect of the flexible storage system 10 that caters to different kinds of storage needs that users may have. A schematic figure of an attachment 300 is shown in FIG. 3A, which includes two connectors 302, 304 that facilitate connecting the attachment 300 to two adjacent, identical, key hole shaped receiving elements 330, 332. Although the attachment 300 is shown to have two adjacent connectors 302, 304, it may be appreciated that this is not necessary and that the attachment 300 can have any number of connectors in any orientation as desired. Each of the connectors 302, 304 includes a connecting element 306 which is attached to the attachment 300 via a shaft/stub 308. The connecting elements 306 of the connectors 302, 304 are circular and facilitate insertion of the attachment 300 into the receiving elements 330, 332.

Each of the receiving elements 330, 332 includes a primary aperture 334, and an elongated slot 336 extending downwards from aperture 334 in a longitudinal direction with a bottom edge 338 in the direction a floor of the vehicle in which the receiving elements are included as shown in FIGS. 1 and 2. Each of the circular surfaces 306 of connectors 302, 304 are received within the primary apertures 334 of the two key hole shaped receiving elements 330, 332 and the shafts 308 of the connectors 302, 304 are simultaneously slid downwards along the slots 336 of the receiving elements 330, 332, wherein the shafts 308 rest on the bottom edges 338 of respective slots and held therein due to the weight of the attachment 300. Furthermore, the connecting elements 306 of the connectors 302, 304, are sized to be received into the primary apertures 334 of the two adjacent receiving elements 330, 332 and are also configured to have greater width than the slots 336 of the receiving elements 330, 332. Therefore, the surfaces 340 (labeled but not seen in FIG. 3A) of the connecting elements 306 facing the attachment 300 rest against the hind surfaces (not seen in FIG. 3A) of the receiving elements 330, 332, hence securely holding the attachment 300 therein.

In order to detach the attachment 300 from the adjacent receiving elements 330, 332, the attachment 300 is conversely moved upwards along the slots 336 of the receiving elements 330 and 332 until the connecting elements 306 of the connectors 302 and 304 are aligned within the respective primary apertures 334 of the receiving elements 330 and 332. In this position, the attachment 300 can be removed from the receiving elements 330 and 332 by forward displacement which removes the connecting elements 306 of the connectors 302 and 304 from the primary apertures 334 of respective receiving elements 332 and 330. Thus, the receiving elements 330, 332 are shaped to receive and hold the storage attachment 330 therein under the weight of the attachment 300.

Various attachments suitable for connecting to one or more of the receiving elements 330, 332 are shown in FIG. 3B. A hook 322, a spectacle case 324, a coffee cup receptacle 326 and a storage box 328 illustrated herein are just a few examples of such attachments, which may be of different sizes and shapes that can be connected to the receiving elements 102. Attachments such as the hook 322 may serve as intermediate pieces for connecting to further attachments (not shown) thereby increasing the flexibility of the storage system. The storage box 328 is an example of an attachment with two connectors in a vertical orientation which can be connected to two key hole shaped receiving elements 102 located one below the other. Thus, various kinds of attachments may be temporarily installed at appropriate locations or may be conveniently detached to provide more space based on a user's necessity.

Figure 4:
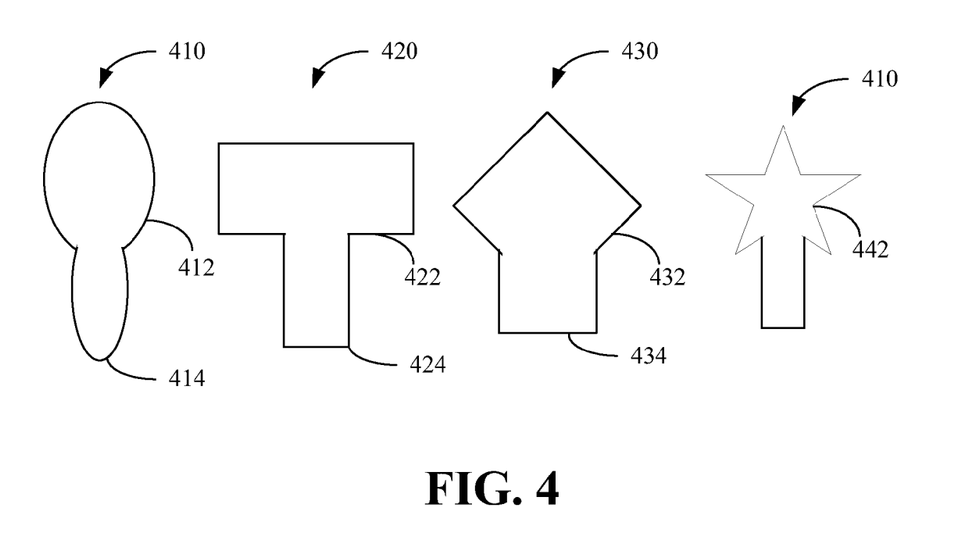
FIG. 4 shows some of receiving elements with apertures and slots having different shapes.

FIG. 4 shows some of the other shapes that may be assumed by the receiving elements 102. The receiving element shown at 410 includes an elongated, oval shaped primary aperture 412 from which a slot 414 extends downwards away from the aperture 412. In other aspects, the receiving element 420 includes a rectangular primary aperture 422 with a similarly shaped slot 424. Another receiving element 430 includes a polygonal primary aperture 432 and a slot 434. In fact, the primary aperture can also be configured as any irregular shape, for example, a star 442 as shown for the receiving element 440. Furthermore, the slot can also assume different shapes such as an oval 414, a rectangular slot 424 or a square shaped slot 434. Therefore, the receiving elements 102 can be configured as various combinations of the primary apertures and slots described herein. It can be appreciated that based on the shapes assumed by the receiving elements, the attachments to be connected to such receiving elements will have complementary connecting elements and shafts to facilitate a detachable yet firm placement of the attachments within the receiving elements.

Figure 5A:
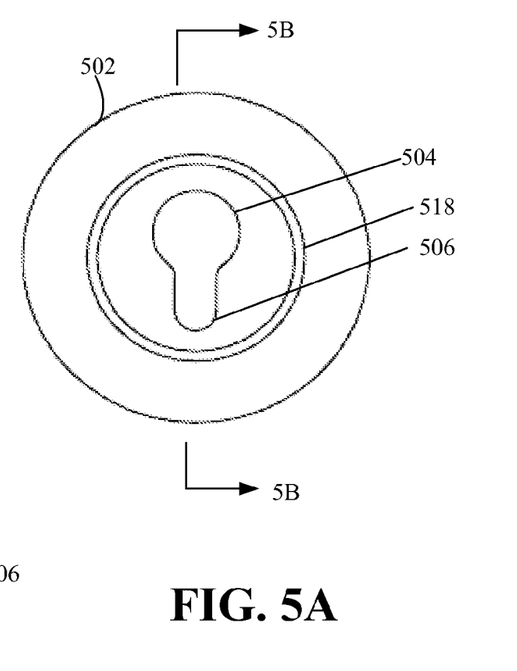
FIG. 5A shows a key hole shaped receiving element included in an interior trim panel.
Figure 5B:
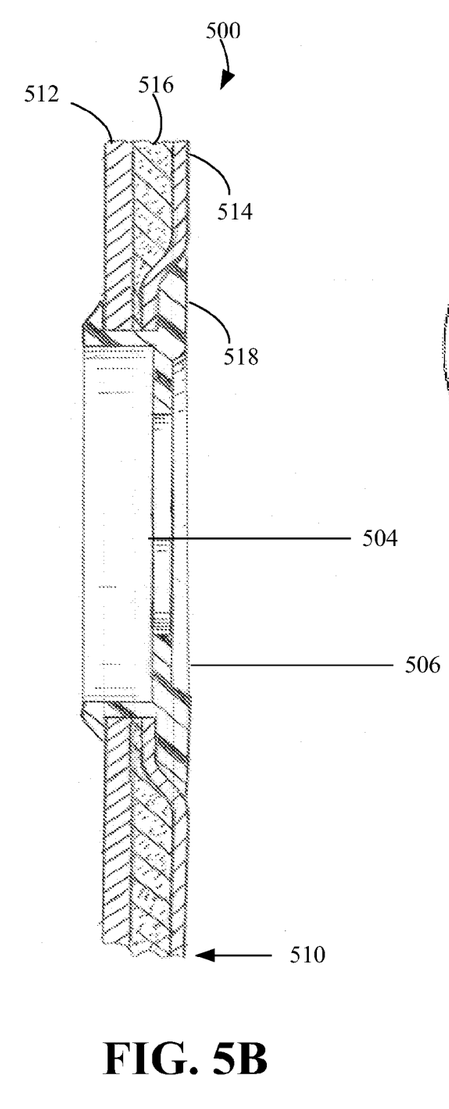
FIG. 5B shows a sectional view of a key hole shaped receiving element included in an interior trim panel.

Based on their placement within a vehicle interior, the receiving elements 102 can be included either on hard, molded plastic components such as map pockets as shown in FIGS. 1 and 2, or on interior trim panels. FIG. 5A shows a key hole shaped receiving element 502 which may be included on a trim panel used in vehicle interiors. FIG. 5B is a sectional view 500 along the section 5B-5B of the key hole shaped receiving element 502 included in an interior trim panel 510. The trim panel 510 generally comprises three different layers of materials. The base of the trim panel 510, made up of hard plastic, is referred to as a substrate 512. The exterior surface of the trim panel 510, that generally faces the passengers in the vehicle interior, is called the A-surface and is made up of a thin leather, fabric or artificial skin 514 that covers the substrate 512. Sandwiched between the substrate 512 and the skin 514 is the foam layer 516, that lends a desirable look and feel/tactility to the trim panel 510.

As seen from the sectional view 510, the primary aperture 504 and the slot 506 of the receiving element 502 are cut through the substrate 512 of the trim panel 510. Inclusion of the receiving element 502 with an aperture 504 and a slot 506 on a trim panel 510 without appropriate treatment can cause the skin 516 and/or the foam layer 516 to be displaced, damaged or otherwise distorted in addition to leading to an unaesthetic appearance. Therefore, the receiving element 502 included on the trim panel 510 is finished with a grommet or an insert 518. The grommet 518 is configured in accordance with the outline of the receiving element 502 and is fixed to the trim panel 510 such that it snaps into the substrate 512 and holds all the three layers 512, 514 and 516 together. In a different aspect, the skin 514 can be stretched to cover the aperture 506 and the slot 508 of the receiving element 502.

Figure 6:
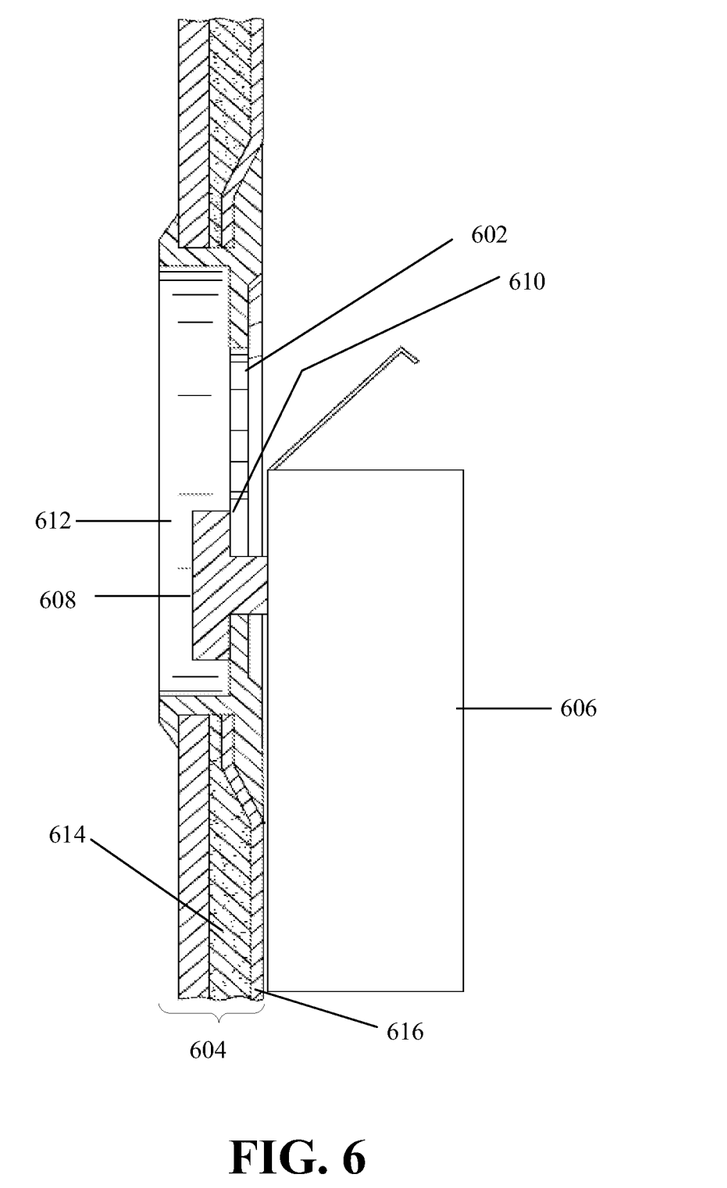
FIG. 6 is another sectional profile of a receiving element included in a trim panel with an attachment connected thereto.

FIG. 6 is another sectional profile of a receiving element 602 included in a trim panel 604 with an attachment 606 connected thereto. As seen from FIG. 6, the trim panel 604 is similar in structure to the trim panel 510 described supra. The attachment 606 is held within an elongated slot 610 of the receiving element 602. Thus, the connecting element 608 of the attachment 606 is held within an interior space 612 located between the trim panel 604 and a backing structure (not shown) holding the trim panel 604 thereon. Again, as described supra, the receiving elements can be located either on a trim panel 604 or on a hard surface comprising one or more layers such as those that make up the map pockets located on vehicle doors. In case of the later, the hard plastic surface with the attachment placed in the receiving element would have similar profile as show in FIG. 6, except that it would not include the various foam 614 or skin 616 layers although it may include multiple plastic layers.

It is may be noted that the flexible storage system in accordance with various embodiments detailed herein provides the convenience of employing different kinds of tools as needed. Moreover, when the tools are not required, they can be entirely removed thereby increasing the space that is available for occupation by the passengers. Although the storage system is illustrated as being located on a vehicle door, it may be appreciated that the receiving elements can be placed at any part of the vehicle interior which is deemed appropriate for flexibly allocating to storage.

Although preferred embodiments of the invention are disclosed for illustrative purposes, those skilled in the art will appreciate that many additions, modifications, and substitutions are possible without departing from the scope and spirit of the invention.

What is claimed is:

1. A storage system, comprising:
a trim panel of a door module of a vehicle, the trim panel including an outer skin facing an interior of the vehicle, an intermediate foam layer, and a hard substrate supporting the intermediate foam layer and the skin; and
one or more receiving elements disposed through the skin, intermediate foam layer, and substrate of the trim panel, each of the receiving elements comprising:
a flange overlying the skin and including an outer surface facing the interior of the vehicle,
a body extending from an inner surface of the flange, opposite to the outer surface, and through the skin, intermediate foam layer, and substrate of the trim panel
a primary aperture extending from the outer surface of the flange and into the body, and
an elongated slot connected to the primary aperture and extending radially from the primary aperture towards a perimeter of the flange,
wherein the one or more receiving elements operate to receive and support one or more attachments that connect to the receiving elements.

2. The storage system of claim 1, wherein the primary aperture has a greater width than the slot.

3. The storage system of claim 1, comprising a plurality of receiving elements.

4. The storage system of claim 1, wherein the primary aperture is shaped as one of a circle and a polygon.

5. The storage system of claim 1, wherein the slot is configured as one of a rectangle, a square and an oval.

6. The storage system of claim 1, wherein the one or more attachments include at least an intermediate component that facilitates attachment of one or more other structures to the receiving elements.

7. The storage system of claim 1, wherein the receiving elements are formed in a hard surface of the vehicle interior.

8. The storage system of claim 1, wherein the attachments comprise a storage device, a flashlight, a cup receptacle and a spectacle case.

9. The storage system of claim 8, wherein at least one of the attachments is received directly into the receiving elements configured within the surface of the vehicle interior without an intermediate connecting component.

10. The storage system of claim 1, wherein each of the receiving elements comprises an insert plugged therein.

11. The storage system of claim 10, wherein each of the inserts is configured in accordance with an outline of a respective receiving element and is fixed to the trim panel such that it snaps into the substrate and holds all layers of the trim panel together.

12. The storage system of claim 1, further comprising at least one of the attachments, which comprises at least one connector complementary to a shape of a corresponding receiving element to facilitate connection therewith.

13. The storage system of claim 12, wherein each of the connectors further comprises a shaft connecting a connecting element to the attachment.

14. The storage system of claim 13, wherein the shaft rests against a bottom edge of the elongated slot when the attachment is held within the one or more receiving elements.

* * * * *